US008319616B2

(12) United States Patent
Girard, III et al.

(10) Patent No.: US 8,319,616 B2
(45) Date of Patent: Nov. 27, 2012

(54) SYSTEM AND METHOD FOR AUTHORIZING A REMOTE DEVICE

(75) Inventors: Hilton W. Girard, III, West Bloomfield, MI (US); Nikolay Yakovenko, West Bloomfield, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 455 days.

(21) Appl. No.: 12/609,644

(22) Filed: Oct. 30, 2009

(65) Prior Publication Data

US 2011/0102138 A1    May 5, 2011

(51) Int. Cl.
  *G06F 19/00* (2011.01)
  *B60R 25/10* (2006.01)
  *G05B 19/00* (2006.01)
  *H04B 3/00* (2006.01)
  *H04N 7/167* (2011.01)

(52) U.S. Cl. ............ 340/426.36; 340/426.25; 340/5.61; 340/426.13; 340/5.72; 701/36; 701/113; 380/203; 726/9; 726/20; 726/23; 726/35

(58) Field of Classification Search .................. None
See application file for complete search history.

(56) References Cited

U.S. PATENT DOCUMENTS

| | | | |
|---|---|---|---|
| 6,101,428 A * | 8/2000 | Snyder | 701/2 |
| 6,218,932 B1 * | 4/2001 | Stippler | 340/426.16 |
| 6,549,116 B1 * | 4/2003 | Honda et al. | 340/5.61 |
| 2003/0193388 A1 | 10/2003 | Ghabra et al. | |
| 2004/0090308 A1 * | 5/2004 | Takahashi et al. | 340/5.72 |
| 2006/0114100 A1 | 6/2006 | Ghabra | |
| 2006/0145809 A1 | 7/2006 | Crowhurst | |
| 2006/0279467 A1 * | 12/2006 | LeMense et al. | 343/711 |
| 2007/0160206 A1 | 7/2007 | Ostrander et al. | |
| 2007/0296562 A1 | 12/2007 | Ghabra | |
| 2008/0107266 A1 | 5/2008 | Kachouh et al. | |
| 2008/0109123 A1 * | 5/2008 | Kachouh et al. | 701/2 |
| 2008/0136611 A1 | 6/2008 | Benco et al. | |
| 2008/0186132 A1 | 8/2008 | Ikeo | |
| 2008/0258870 A1 | 10/2008 | Sugiura | |

FOREIGN PATENT DOCUMENTS

EP       1630050 A2    3/2006

* cited by examiner

*Primary Examiner* — Jennifer Mehmood
*Assistant Examiner* — Fekadeselassie Girma
(74) *Attorney, Agent, or Firm* — Brooks Kushman P.C.

(57) ABSTRACT

A system and method for authorizing a remote device amongst multiple remote devices for passive functions, such as passive entry and passive start, includes a vehicle having a plurality of strategically located antennas, combinations of which transmit a query signal and receive query responses, a challenge antenna amongst the plurality of antennas for transmitting a challenge signal to at least one of the multiple remote devices in accordance with a challenge order, and a control unit having a controller in communication with the antennas for determining the challenge order based upon the query responses. The controller can determine whether a remote device is located in an authorization zone, out of an authorization zone, or whether the remote device's location is indeterminate.

20 Claims, 6 Drawing Sheets

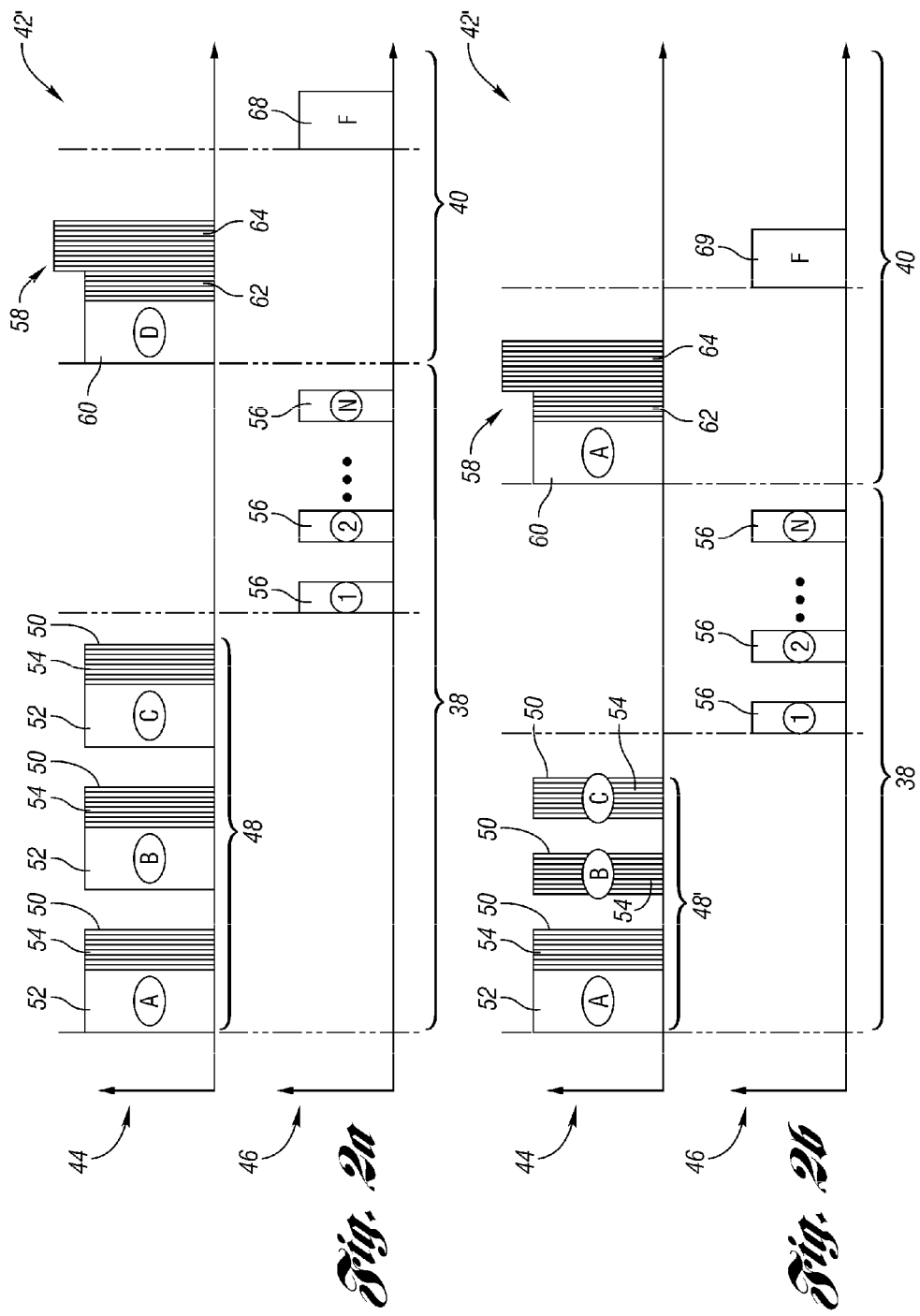

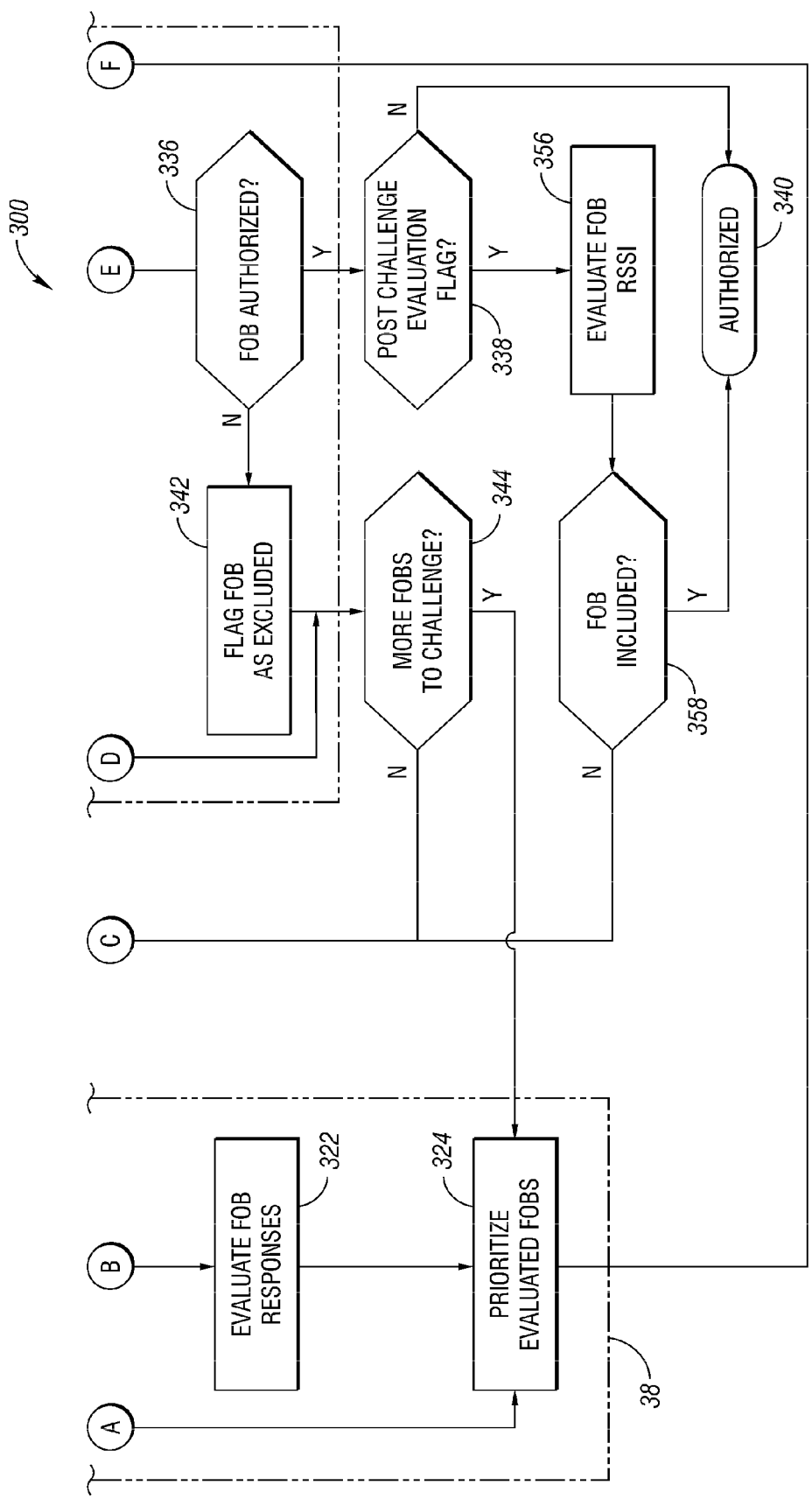

SYSTEM AND METHOD FOR AUTHORIZING A REMOTE DEVICE

TECHNICAL FIELD

The following relates to a system and method for authorizing a remote device for passive vehicle functions such as passive entry and passive engine starting.

A detailed description and accompanying drawings are set forth below.

BRIEF DESCRIPTION OF THE DRAWINGS

FIG. 2a depicts a simplified, exemplary signal diagram in accordance with one or more embodiments of the present application;

FIG. 2b depicts an alternate simplified, exemplary signal diagram in accordance with one or more embodiments of the present application;

FIGS. 3a-b illustrate a simplified, exemplary process flowchart depicting a method in accordance with one or more embodiments of the present application.

DETAILED DESCRIPTION

Figure 1:
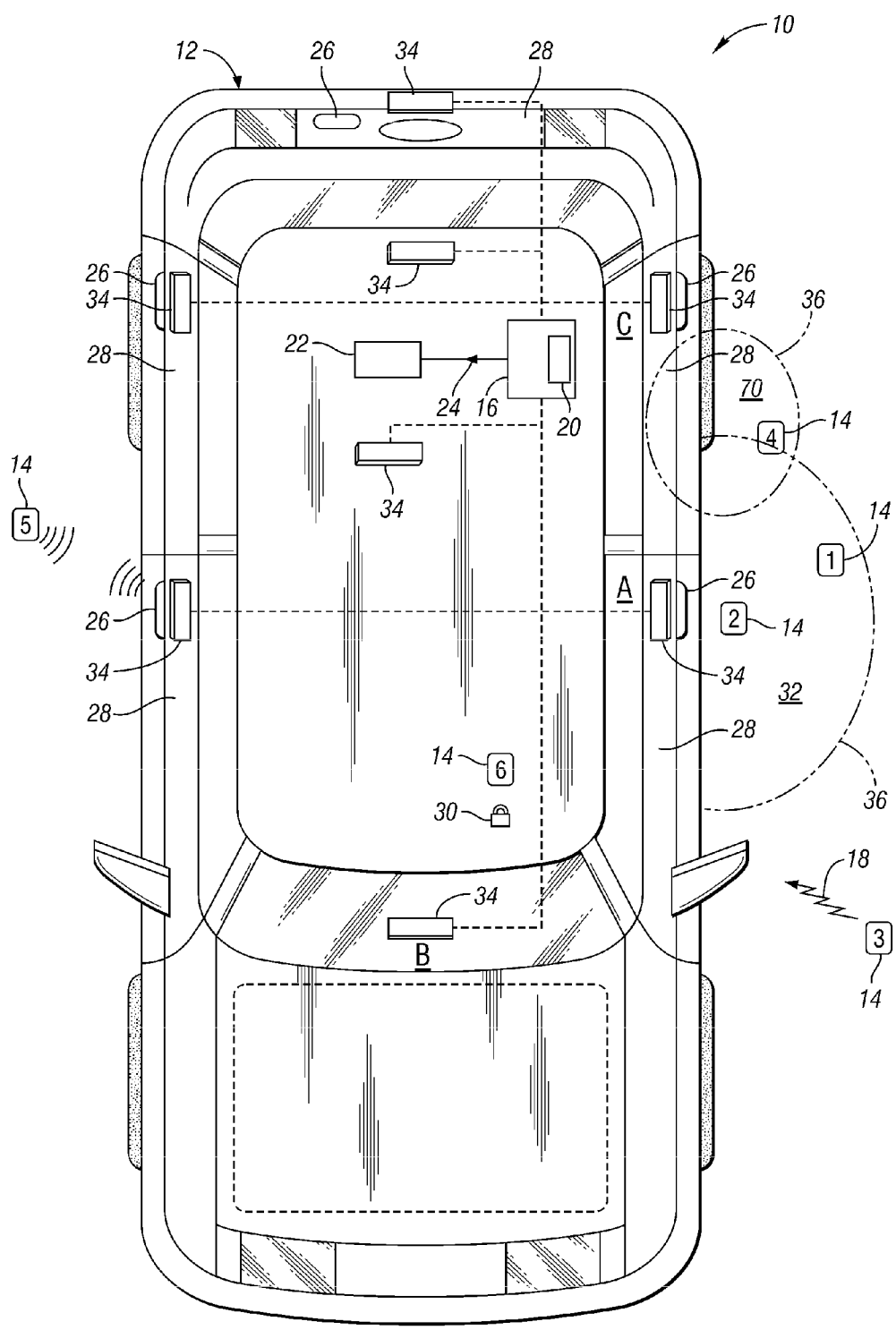
FIG. 1 depicts a simplified, exemplary environmental diagram in accordance with one or more embodiments of the present application.

With reference to FIGS. 1-4, a more detailed description of embodiments of the system and method and various components thereof will now be provided. It is well known in the automotive industry to provide wireless communication systems in vehicles for a variety of applications. These include, but are not limited to, remote keyless entry (RKE), tire pressure monitoring, remote control of garage door opening systems, vehicle immobilization, voice activated controls, and others.

Typical RKE systems provide for remote control by a vehicle owner or user of vehicle security systems, door locks, trunk latch, exterior and/or interior lights, horn and/or alarms. Other vehicle systems or operations that may be remotely controlled by a vehicle user or owner with RKE systems include sliding-door or lift-gate control, remote engine start, vehicle interior climate control, and others.

In that regard, systems for remote vehicle access and other remote operations include a remote control device or unit, which is commonly referred to as a "fob" or "key fob." The remote control unit has a transmitter, and wireless radio frequency ("RF") signals are transmitted by the transmitter of the remote control unit that include commands for performing vehicle operations or functions such as unlocking the vehicle doors or starting the vehicle engine. Currently available fobs are hand-held, portable devices, and may be separate units or may be part of an ignition key head.

Such systems also typically include a receiver and/or device control unit installed in the vehicle. RF command signals transmitted by the remote control unit are received by the vehicle-mounted receiver and/or device control unit, and may be relayed to appropriate control circuitry, systems or subsystems in the vehicle in order to effectuate the desired operation or function. For example, the receiver and/or device control unit may be provided in direct or indirect (e.g., over a vehicle bus) communication with door locking mechanisms to lock and unlock the vehicle doors in response to lock or unlock signals received from the remote control unit. Similarly, the receiver and/or device control unit may be provided in communication with other vehicle devices to control operation thereof in response to other signals received from the remote control unit.

Remote communication systems may be active or passive in nature. Active systems require a vehicle owner or user to manually transmit a command signal, such as by actuating one or more push-buttons provided on the remote control unit. In passive systems, signals are automatically transmitted so that, for example, a vehicle door may be unlocked as the vehicle owner or user approaches the vehicle and/or touches the door handle to open the door, without the need for any additional action by the vehicle owner or user.

In that regard, in a passive keyless entry system, a remote unit, which may be referred to as a "fob" or a "card," is typically provided with a transceiver for communicating with a transceiver and/or device control unit installed in the vehicle. In such systems, the remote unit carried by an operator may be used, for example, to automatically unlock the vehicle as the operator approaches the vehicle, without the need for operation of any switch or pushbutton by the operator. Similarly, the system may further be designed to automatically lock the vehicle as the operator, carrying the remote unit, moves away from the vehicle. A vehicle-mounted transceiver and/or device control unit is again provided in direct or indirect communication with control circuitry, systems or subsystems to effectuate a particular operation in response to signals received from the remote unit, such as door locking mechanisms to lock and unlock the vehicle doors. In a passive engine starting system, the vehicle ignition may be unlocked without the use of an ignition key. Rather, the operator may request engine start with the simple push of an ignition button. The operator's credentials are verified with the automatic exchange of signals between the remote device carried by the operator and the device control unit.

RKE systems are referred to as "one-way" systems where communication or transmission of signals only takes place from the portable remote control unit having a transmitter to the vehicle-mounted device having a receiver. However, as is again well known by those of ordinary skill, such systems may also be "two-way" in nature. In "two-way" systems, the portable remote control unit carried by the vehicle user or owner includes a transceiver, and the vehicle-mounted device also includes a transceiver. As both the remote control unit and the vehicle-mounted device are capable of transmitting and receiving wireless signals, two-way communication between those devices is enabled.

In "two-way" systems, communication from the vehicle-mounted device or unit to the portable remote control device or unit may be for any of a number of purposes, such as for prompting a passive remote control device to transmit a signal, acknowledging the receipt of a command signal from a remote unit, or others. In that regard, the remote control device or unit may be provided with a display, such as a liquid crystal or light emitting diode display, so that the vehicle owner or user can confirm that a command signal has been received by the vehicle-mounted device or unit and that the command has been effectuated (e.g., the vehicle doors have been locked/unlocked; the vehicle engine has been started).

A two-way passive entry system requires that an authorized remote unit or fob be placed on or near a person who is attempting to gain entry into a locked vehicle. The locked vehicle contains a fixed control unit including a primary controller for the passive entry system. The passive entry system must be mated with the remote units for the exchanging of private security keys and other information. Multiple remote units can be mated to the system in the case of multiple users. In the case where multiple remote units are present, system latency is of the utmost importance, particularly when their locations may not initially be known.

Referring now to the drawings, a system and method for authorizing a remote device, amongst multiple remote devices, as quickly as possible is disclosed. FIG. 1 is a simplified, exemplary environmental diagram of a passive activation system 10 for a vehicle 12 according to one or more embodiments of the present application. The term passive activation system as used herein may at least refer to a passive entry system, a passive engine starting system, or both. The system 10 may include one or more remote transceivers 14 capable of two-way wireless communication with a vehicle transceiver or control unit 16 installed in the vehicle 12. Each remote transceiver 14 may be a separate fob or card, part of a vehicle ignition keyhead, or any other suitable configuration known in the art. The remote transceivers 14 may be operable with both active and passive vehicle systems. To this end, an operator (not shown) may use the remote transceiver 14 from a distance to actively transmit a command signal 18 that includes a command message in order to remotely perform a desired vehicle operation or function represented by the command message, such as locking or unlocking vehicle doors, activating or deactivating a vehicle security system, activating or deactivating vehicle interior and/or exterior lights, starting the vehicle engine, and/or others. Such a transmission by the remote transceiver 14 may be in response to user input, which may be provided to the remote transceiver in any fashion known in the art, such as actuation of a push-button or by voice recognition.

In active systems, the command signal 18 may ultimately be received at the vehicle-mounted control unit 16, which may be mounted at any suitable location on the vehicle 12. The control unit 16 may include a controller 20 operable to relay the command message of the command signal 18 to an appropriate vehicle function 22 in order to effectuate the command, such as locking or unlocking vehicle doors, activating or deactivating a vehicle security system, activating or deactivating vehicle interior and/or exterior lights, starting the vehicle engine, and/or others. In that regard, the vehicle function 22 may be, for example, a computer, microprocessor, control circuit, logical device, vehicle system, vehicle device, or vehicle subsystem, or the like. Relay of the command message by the control unit 16 may include translation of the command message of the command signal 18 by the controller 20 into an output control signal 24. The control unit 16 may be provided in direct communication with the vehicle function 22, or may be provided in communication with the vehicle function indirectly, such as over a vehicle data or communications bus (not shown).

In passive systems, however, the command message may not be received in a command signal transmitted from a remote transceiver. Rather, the command message may be generated at the vehicle 12 by sensor systems (not shown) monitoring operator behavior, such as the approaching or touching of an access handle 26 for a door or liftgate 28 or the depressing of an ignition switch 30. When the passive activation system 10 is activated during an attempt to gain entry, e.g., by physically pulling an access handle, a successful authorization process must occur that involves two-way wireless communication with a remote transceiver before the command message is relayed to the appropriate vehicle function for carrying out the command. As part of the authorization process, the passive activation system 10 may expect a remote transceiver 14 to be physically located in an authorization zone 32 in order to gain entry into a specific access point, such as the door 28. When multiple remote transceivers 14 are present, the passive activation system 10 must identify and authorize a valid remote transceiver with minimal system latency.

As shown in FIG. 1, the passive activation system 10 may include a plurality of antennas 34 electrically coupled to the control unit 16. The plurality of antennas 34 may be strategically located throughout the vehicle 12 in order to define several authorization zones, though just one authorization zone 32 is depicted for exemplary purposes. Each authorization zone 32 may be defined using a different combination of one or more antennas 34. The authorization zone 32 that is active may depend upon an operator's action. For instance, if an operator is attempting to gain entry to the vehicle 12 by pulling on the access handle 26 for the driver door, then the authorization zone 32 may encompass a region immediately adjacent the access handle 26 for the driver door. A different authorization zone may become active if the system 10 determines that an attempt to gain entry is occurring at an alternate location.

The authorization zone 32 may be created by defining its boundaries 36 using inclusion and exclusion criteria based on signal amplitudes from at least one of the multiple strategically located antennas 34. For example, an arbitrary, irregular shaped authorization zone may be defined using three strategically located antennas so long as the zone's span is confined to the coverage area of the three antennas. As previously mentioned, a different authorization zone may be specified using a different combination of antennas. It should be noted that an authorization zone is not necessarily irregular-shaped when three antennas are employed. Rather, the use of three antennas just means that specification of an irregularly-shaped zone is possible. As another example, an ecliptically-shaped authorization zone may be specified using just two strategically located antennas. Of course, an authorization zone may be specified using a single antenna or a combination of more than three antennas without departing from the scope of the present application. For purposes of description only, references made herein may be to authorization zones defined using a three-antenna configuration although other configurations are fully contemplated.

Referring generally to FIGS. 2a-b and 3a-b, the authorization process may be conducted in two stages: a query phase 38 and a challenge phase 40. Collectively, the query phase and the challenge phase make up at least a portion of an authorization session. During the query phase 38, the passive activation system 10 may look for the presence of at least one remote transceiver 14 in the authorization zone 32. If one or more remote transceivers 14 are discovered in the authorization zone 32, the passive activation system 10 may then attempt to validate the security credentials of at least one remote during the challenge phase 40. As soon as one remote transceiver 14 is validated, the authorization session may end and the passive vehicle function may be executed, e.g., automatic door lock/unlock, passive start, trunk, liftgate, liftgate window unlock. Similarly, the passive activation system 10 may look for the presence of more than one remote transceiver 14 in the authorization zone 32. If multiple remote transceivers 14 are discovered in the authorization zone 32, the passive activation system 10 may then attempt to validate the security credentials of all remote transceivers during the challenge phase 40. As soon as all remote transceivers 14 are validated, the authorization session may end and any passive related functions may be executed for the purpose of search, location or other similarly related functions.

With specific reference to FIG. 2a, a simplified, exemplary signal diagram 42 according to one or more embodiments of the present application is shown. The axis of abscissa may represent time in a relative manner; the specific timing of the signals may vary and, thus, the time scale is not necessarily fixed. An upper portion 44 of the signal diagram 42 depicts signals transmitted from the vehicle-mounted antennas 34, while a lower portion 46 of the signal diagram depicts signals transmitted from the remote transceivers 14. The antennas 34 may transmit short-range low frequency (LF) data signals to the remote transceivers 14. On the other hand, the remote transceivers 14 may transmit long-range data signals to the vehicle 12. For example, the remote transceivers 14 may transmit long-range ultra high frequency (UHF) signals to the vehicle.

During a first communication phase, the query phase 38, a remote transceiver's location with respect to the authorization zone 32 may be determined by transmitting a query signal 48. The query signal 48 may include, for example, a plurality of sequential signal bursts 50 comprising a single signal burst transmitted from each of three query antennas 34 (A, B, C) employed to query for the presence of remote transceivers 14 in a particular authorization zone. All remote transceivers 14 within range may receive the signal bursts 50 in discrete time steps. Each signal burst 50 may include a data portion 52 and a signal portion 54. The signal portion 54 may be a continuous wave (CW) signal transmitted at a predetermined frequency for a predetermined period of time. The data portion 52 may include instructions for the remote transceiver 14 to sample the signal amplitude of the signal portion 54. The data portion 52 may further include instructions for the remote transceiver 14 to transmit a reply signal 56 in response to the query signal 48 containing the sampled signal amplitudes from each antenna burst 50. To this end, each remote transceiver 14 may include a received signal strength indicator (RSSI) as is known in the art.

In response to the query signal 48, each remote transceiver 14 in range may transmit the reply signal 56, containing the RSSI data for each antenna 34, back to the system 10. Each reply signal 56 may comprise a single data burst transmitted within a discrete time frame per remote transceiver 14 to prevent signal collisions. The positions of the remote transceivers 14 can then be evaluated by the passive activation system 10 using, for example, a known triangulation method that may compare the received signal amplitudes against previously programmed criteria. The criteria may be empirically predetermined to create the authorization zone boundaries 36 having defined inclusion and exclusion areas based on combinations of at most three absolute signal amplitude thresholds corresponding to the three query antennas. It should be noted that a triangulation method may not be necessary for authorization zones generated using fewer than three antennas because such zones have a certain characteristic shape and, based on signal amplitudes from the antenna(s), it can be determined whether a remote transceiver is within the boundaries of this characteristic shape.

When a remote transceiver is determined to be within the defined authorization zone 32, it may then be confirmed with a second communication phase, the challenge phase 40, using a challenge/response protocol to explicitly validate the security credentials. In the case where the presence of multiple remote transceivers 14 are detected, a challenge hierarchy may be employed in order to prioritize the remote transceivers 14 and determine a challenge order. The hierarchy may identify the remote transceiver 14 that is the best candidate for challenging, which can help to minimize system latency. According to one or more embodiments of the present application, the challenge hierarchy may utilize a primary priority order and a secondary priority order. The primary priority order may involve classifying each remote transceiver 14 based upon its evaluated position. For instance, based upon its evaluated position, it can be determined whether a remote transceiver is in an excluded, included or indeterminate position with respect to the specified authorization zone 32. The secondary priority order may prioritize remote transceivers sharing the same classification, e.g., included or indeterminate. According to one or more embodiments, the RSSI data received in the reply signal 56 from each remote transceiver 14 may be used to determine the secondary priority order.

According to the challenge hierarchy, excluded remote transceivers may be assigned the lowest priority and disregarded for challenge purposes. Excluded remote transceivers may never be considered for the challenge phase because of their physical location. Included remote transceivers, on the other hand, may be remote transceivers positively determined to be positioned within the authorization zone 32. Therefore, included remote transceivers may receive the highest challenge priority. When multiple included remote transceivers are present within the authorization zone 32, a remote transceiver having a higher RSSI value (i.e., nearer position) may receive higher secondary priority than a remote transceiver with a lower RSSI value.

A challenge antenna 34 (D) may be selected for initiating the challenge phase 40. The challenge antenna may or may not be one of the query antennas selected for the query phase 38. Under certain circumstances, the challenge antenna responsible for communications during the challenge phase 40 may be predetermined based upon, for instance, operator action. For example, when the passive activation system 10 is attempting to authorize a remote transceiver upon the physical touching of an access handle, the antenna 34 nearest the relevant access handle 26 may be specified as the challenge antenna. Other circumstances may dictate that the challenge antenna is not initially known. If the challenge antenna has been explicitly specified for use in the authorization zone 32, then the secondary priority order may be based solely upon the signal amplitude of the specified challenge antenna, but only if RSSI data for that antenna was previously sampled during the query phase. If a challenge antenna is not specified beforehand or the challenge antenna that is specified is not one of the query antennas used during the query phase, then the secondary priority order may be based upon the sum of all query antenna signal amplitudes sampled during the query phase. Alternately, the secondary priority for when the challenge antenna is not predetermined may be based upon the single, strongest signal amplitude received out of all the query antennas. The secondary priority order may help insure that the remote transceivers 14 with a higher challenge priority will have a better signal to noise ratio, which may provide the best chances for successful communication during the challenge phase 40.

Potentially, remote transceivers 14 may be physically within the authorization zone 32, but not enough information could be gathered from the query antennas to make a positive determination. These remote transceivers may be classified as indeterminate. A remote transceiver with an indeterminate position may receive lower priority than a remote transceiver evaluated to be in an included position. Indeterminate remote transceivers can be an exceptional case. Thus, indeterminate remote transceivers may require additional advanced processing to determine their exact position. Similar to the included remote transceivers described above, an indeterminate remote transceiver with a higher RSSI value (i.e., nearer position) may likewise receive higher secondary priority than an indeterminate remote transceiver with a lower RSSI value.

Accordingly, the challenge hierarchy for determining the challenge order may be represented as follows:
1) Included remote transceivers with higher RSSI;
2) Included remote transceivers with lower RSSI;
3) Indeterminate remote transceivers with higher RSSI;
4) Indeterminate remote transceivers with lower RSSI; and
5) Excluded remote transceivers.

After prioritization of multiple remote transceivers is complete, and the challenge order determined, the remote transceiver 14 having the highest priority may be challenged first, as it may be the best candidate for authorization amongst other remote transceivers. The challenge phase 40 may begin by determining whether the remote transceiver 14 having the highest priority is classified as included. If the remote transceiver 14 is included, the challenge antenna may be determined. As previously mentioned, the challenge antenna may be predetermined based on the passive function presently occurring (e.g., passive entry through physical touch of a specific door handle). In other instances, the challenge antenna may not be determined until after the query phase 38 is complete, at which time a suitable challenge antenna may be selected. Again, it should be noted that the challenge antenna may not necessarily be one of the query antennas. In any event, once determined, the challenge antenna may transmit an encrypted challenge signal 58 to the remote transceiver 14 having the highest challenge priority. The encrypted challenge signal 58 may include an encrypted data portion 60 and one or more signal portions 62, 64. The encrypted data portion 60 may carry a security challenge. The one or more signal portions 62, 64 may be continuous wave (CW) signals, transmitted at a predetermined frequency for a predetermined period of time, which may be used for RSSI measurement. The control unit 16 may then await a response from the remote transceiver 14. If the challenged remote transceiver 14 receives the encrypted challenge signal 58 from the challenge antenna, the challenged remote transceiver may send an encrypted response signal 68 back to the control unit 16 confirming its security credentials. The encrypted response signal 68 may be validated if the encryption matches. If valid, the challenged remote transceiver 14 may be authorized and the passive function may be carried out.

If, however, the challenge fails, the challenged remote transceiver 14 may be considered as excluded for the remainder of the authorization session. In this instance, the remote transceiver having the next highest priority may be challenged next. The challenge process may repeat until a remote transceiver is successfully authorized or there are no more included remote transceivers remaining to be challenged. As previously mentioned, the prioritization process may yield improved performance latency for successful passive system operation. Although system latency may increase as more remote transceivers are challenged, performance may be optimized by keeping the increments of latency as small as possible by always challenging a remote transceiver determined to be the next best candidate according to the challenge hierarchy.

If all remote transceivers classified as included have been excluded due to failure of the challenge phase 40, the system 10 may turn to the indeterminate remote transceivers for authorization. In this regard, the indeterminate remote transceivers may undergo further evaluation. This further evaluation may include querying at least one of the indeterminate remote transceivers again using one or more sub-authorization zones ("sub-zones") 70, as shown in FIG. 1, specified by the passive activation system 10. Re-querying against additional sub-zone criteria may help to resolve an indeterminate position. To this end, sub-zone processing may involve one or more additional and/or different antennas 34 to acquire more strategic location information for indeterminate remote transceivers. Like the initial query phase, a second query signal comprising one or more additional signal bursts may be transmitted from the sub-zone antenna configuration. Additional, and perhaps more conclusive, location information may be obtained in reply signals 56 transmitted from the remote transceivers 14 in response to the second query signal. Although system latency may suffer if additional sub-zone processing is required to authorize a remote transceiver, insuring fail-safe operation of the passive activation system 10 may now take precedence. Accordingly, the passive activation system 10 may make every available attempt to authorize a valid remote transceiver 14. Degradation in latency may be acceptable in such instances in order to obtain a successful authorization.

During sub-zone processing, new signal amplitudes may be accumulated for all responding remote transceivers 14 and their RSSI data evaluated in a similar fashion as the initial query phase. The remote transceivers 14 may then be re-prioritized and a new challenge order for challenging the remote transceivers in the aforementioned manner. The authorization process may repeat until either a valid remote transceiver has been authorized or all remote transceivers have been exhaustively and definitively excluded.

FIG. 2b depicts an alternate, exemplary signal diagram 42' according to one or more embodiments of the present application, wherein like elements are given like reference numerals. The signal diagram 42' in FIG. 2b be may be representative of a signal sequence for a door lock/unlock protocol. As seen therein, the signal burst 50 from the first query antenna 34 (A) may include both the data portion 52 and the signal portion 54. However, the signal bursts 50 from the other query antennas 34 (B, C) may only include the signal portion 54. During an attempt by an operator to gain entry at a vehicle door, the approaching or physical touching of the door's access handle 26 may trigger the passive activation system 10 to perform passive entry. The authorization zone 32 selected for use by the passive activation system 10 may be fixed to encompass a region immediately adjacent the chosen door 28. Moreover, the challenge antenna may be predetermined to be the antenna located nearest the corresponding access handle 26. Thus, the first query antenna 34 (A) may also be the challenge antenna. In this instance, it may not be necessary to include a data portion containing instructions with the signal bursts 50 sequentially transmitted from the other query antennas 34 (B, C) because if a remote transceiver does not respond to at least the first query antenna, then the passive activation system 10 may not want to authorize that remote transceiver. As a result, system latency may be improved since the query signal 48' may take less time to transmit.

Figure 3A:
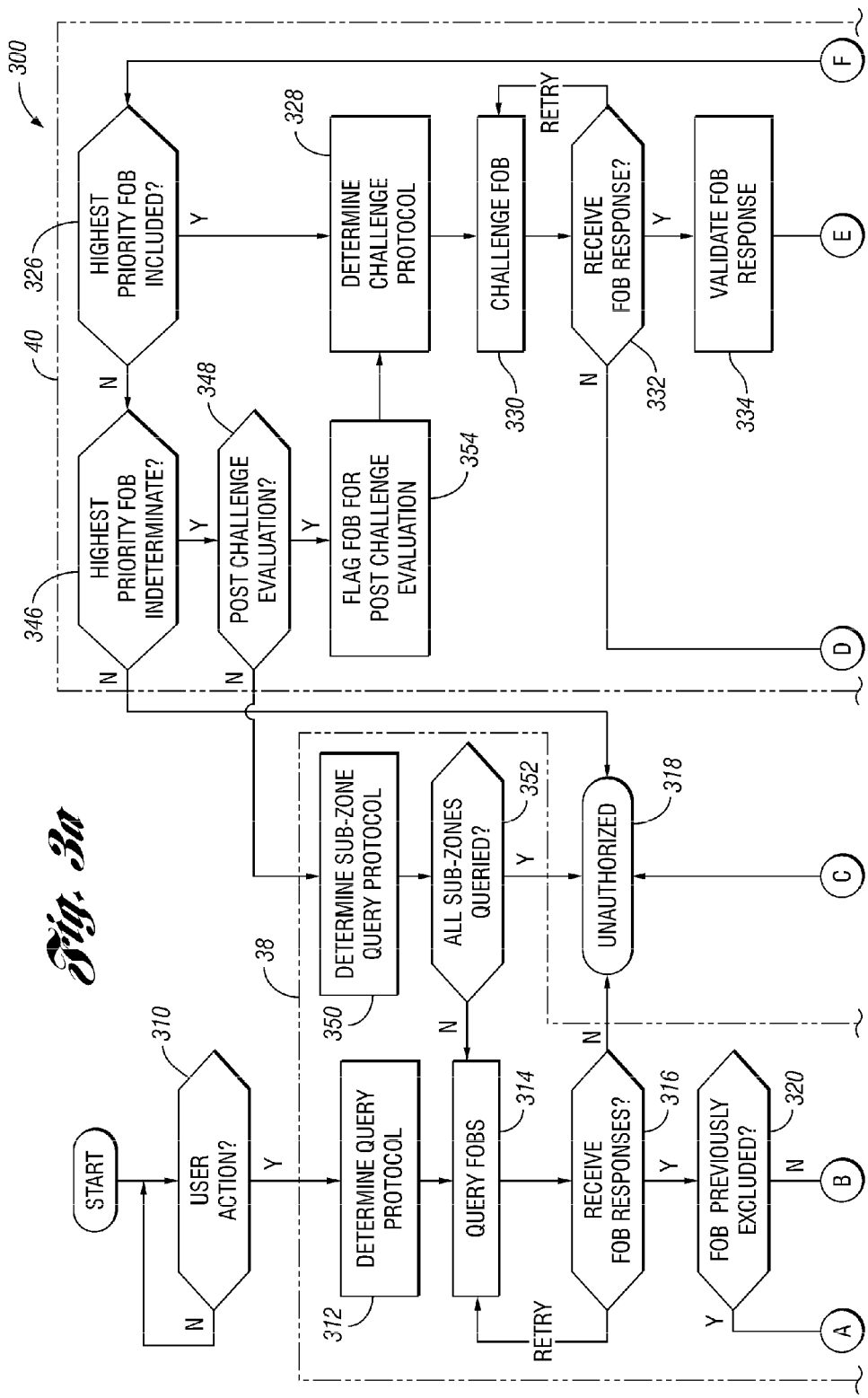

Referring now to FIGS. 3a-b, a simplified, exemplary process flowchart 300 depicting one or more embodiments for authorizing a remote transceiver 14 in connection with the passive activation system 10 is shown. As seen therein, the authorization session may begin when the passive activation system 10 (e.g., via controller 20) detects certain behaviors or actions towards the vehicle by a person, operator or user (310). For example, the physical touching of an access handle 26 (e.g., door, trunk, liftgate, liftgate window, etc.) may prompt the passive activation system 10 to authorize a remote transceiver 14 for passive entry. Likewise, the pressing of the pushbutton ignition switch 30 may trigger an authorization attempt for passive engine starting. The passive activation system 10 may continuously monitor for triggering activity. Moreover, the system 10 may only monitor for some triggering activity, rather than all triggering activity, depending on certain vehicle operating conditions at the time. Under some vehicle operating conditions, the passive activation system 10 may not be active at all. If action is detected that prompts an authorization session to occur, the query phase 38 may be initiated. Accordingly, the system may first determine the query protocol for carrying out the initial query phase (312). The query protocol may be based upon the particular user action that prompted the authorization session. For instance, if an attempt to gain entry is detected, the system 10 may first identify the access point, then apply the query protocol best suited to carry out the query phase 38. To this end, the query protocol may include instructions telling the system which antennas 34 to use, what signals to transmit, what data to include in those signals, as well as identify the boundary 36 of the relevant authorization zone 32.

Once the query protocol is determined, the system 10 may query for the presence of one or more remote transceivers 14 within the authorization zone 32 (314). This may include, for instance, transmitting a query signal 48 from one or more query antennas. Accordingly, in one example, the query signal 48 may include three sequential signal bursts 50 from three different antennas strategically located on the vehicle 12. The signal bursts 50 may be transmitted in discrete time steps so that the signal amplitude of each may be sampled by any remote transceivers 14 within the transmission range. Data within the signal bursts 50 may include messages requesting a reply signal 56 from each remote transceiver 14 in response to the query signal 48. The reply signal 56 may contain RSSI data corresponding to the sampled signal amplitudes for each query antenna signal burst 50. Accordingly, the passive activation system 10 may determine whether any reply signals 56 have been received from the remote transceivers 14 (316). If no responses are received, the querying step may be retried a predetermined number of times. If no response is received from a remote transceiver 14 after the retries have been exhausted, the system 10 may conclude that the authorization has failed and end the authorization session (318). If, on the other hand, a reply signal 56 from at least one remote transceiver 14 is received, the authorization session may continue. Next, the system 10 may determine whether any of the responding remote transceivers 14 were previously excluded during another portion of the authorization session (320). Therefore, this step may not be relevant during the initial query phase as no remote transceivers have been characterized as excluded yet.

Each reply signal 56 received from the responding remote transceivers 14 may then be evaluated to determine whether the position (location) of the corresponding remote transceiver is included in the authorization zone 32, excluded from the authorization zone 32, or indeterminate (322). In doing so, the system 10 may evaluate the RSSI data collected from each remote transceiver 14. As previously described, an RSSI value for each remote transceiver 14 may be based upon the RSSI data collected from just one of the query antennas (e.g., a predetermined challenge antenna) or may be based upon the summation of RSSI data collected from all of the query antennas. Once the reply signals 56 from the remote transceivers 14 have been evaluated, the remote transceivers 14 may be sorted in accordance with the challenge hierarchy to minimize latency (324). The challenge hierarchy may determine the order in which the remote transceivers 14 are challenged during the challenge phase 40 of the authorization session. The challenge order may be based primarily upon the classification of the remote transceivers 14 as either included, excluded or indeterminate. Further, the challenge order may be based secondarily upon the RSSI value obtained for each responding remote transceiver. To this end, included remote transceivers with a higher RSSI value may have priority over included remote transceivers with a lower RSSI value. In turn, included remote transceivers with a lower RSSI value may have priority over indeterminate remote transceivers. Indeterminate remote transceivers with a higher RSSI value may have priority over indeterminate remote transceivers with a lower RSSI value. Finally, indeterminate remote transceivers with a lower RSSI value may have priority over excluded remote transceivers. Referring briefly back to step 320, previously excluded remote transceivers do not need to be evaluated again by their RSSI data as they may be treated as excluded for the remainder of the session. Thus, step 322 may be skipped for the previously excluded remote transceivers.

Once the remote transceivers 14 have been prioritized based on their query responses, the challenge phase 40 may begin. The first step of the challenge phase may be to determine whether the location of the remote transceiver 14 presently given the highest priority is classified as included (326). If the remote transceiver 14 is included, then the challenge protocol for challenging the remote transceiver may be determined (328). The challenge protocol may dictate, for example, which antenna is the challenge antenna. Once the challenge antenna is determined, the remote transceiver 14 having the highest priority may be challenged (330). Specifically, the challenge antenna may transmit an encrypted challenge signal 58 to the remote transceiver 14 having the highest challenge priority. The challenge antenna may then await a response from the remote transceiver (332). If the challenged remote transceiver 14 receives the encrypted challenge signal 58 from the challenge antenna, the challenged remote may send an encrypted response signal 68 back to the control unit 16 to confirm its security credentials. If no responses are received, the remote transceiver challenge may be retried a predetermined number of times until a response is received.

If an encrypted response signal 68 is received from the remote transceiver 14, then the system 10 may attempt to validate the response signal (334). The encrypted response signal 68 may be validated if the encryption matches the encryption of the challenge signal 58. Based on the exchange between the challenge antenna and the remote transceiver, the system 10 can determine whether the remote transceiver is authorized (336). If the challenged remote transceiver 14 is authorized, the system 10 may determine whether to conduct a post-challenge evaluation of the response signal 68 (338). In doing so, the system 10 may determine if it has been flagged to perform the post-challenge evaluation earlier in the process. The post-challenge evaluation process will be described in greater detail to follow. Assuming a post-challenge evaluation flag has not been set, the system 10 may conclude that authorization of the remote transceiver 14 was successful and the passive function may be carried out (340).

Returning to step 336, if it is determined that the remote transceiver 14 is not authorized because its response cannot be validated, the system 10 may classify, label or otherwise flag the challenged remote transceiver as excluded (342). Accordingly, the remote transceiver 14 may be treated as excluded for the remainder of the authorization session. Thereafter, the system 10 may determine whether there are more remote transceivers 14 to challenge (344). If multiple remote transceivers 14 responded during the query phase 38, additional remote transceivers may remain available for challenge purposes. If no remote transceivers remain to be challenged, the system 10 may conclude that the authorization has failed and end the authorization session (318). However, if additional remote transceivers 14 remain to be challenged, the process may return to step 324 where the remaining remote transceivers may be re-prioritized. Namely, the remote transceiver 14 flagged as excluded at step 342 due to an unsuccessful challenge may be shuffled to the bottom of the challenge order so that the remote transceiver with the next highest priority may be challenged.

Returning to step 332, if no response is received and the predetermined retry count has been exhausted, the system may determine whether there are more remote transceivers 14 to challenge (344). If so, the process may also return to step 324 where the remaining remote transceivers may be re-prioritized. Thereafter, the process may then return to step 326 where it can be determined whether the position of the new highest priority remote transceiver 14 is included. If the remote transceiver 14 is included, it may be challenged in the manner previously described beginning at step 328. If, however, there are no remaining remote transceivers 14 whose position is included in the authorization zone, the system 10 may then determine whether the location of the highest priority remote transceiver 14 remaining to be challenged is indeterminate (346). If the answer is no, then it may be assumed that the remaining remote transceivers 14 have been classified as excluded. Accordingly, the system 10 may conclude that the authorization has failed and end the authorization session (318). However, if the highest priority remote transceiver 14 is indeterminate, further evaluation may take place to definitively resolve its location.

Upon further evaluating an indeterminate remote transceiver, the system 10 may first determine whether certain conditions exist that call for a post-challenge evaluation to be performed on the remote transceiver (348). Accordingly, such conditions may be referred to as post-challenge evaluation conditions. Satisfaction of the post-challenge evaluation conditions may signify that virtually all steps to authorize a remote transceiver have been exhausted and that one final analysis may be performed at the conclusion of the challenge phase 40. Assuming that the post-challenge conditions have not been met, the aforementioned sub-zone processing may commence. As previously described, the sub-zone processing may include querying indeterminate remote transceivers using one or more sub-authorization zones ("sub-zones") 70 specified by the passive activation system 10. Re-querying against additional sub-zone criteria may help to resolve an indeterminate position. Sub-zone processing may involve one or more additional and/or different antennas 34 to acquire more strategic location information for indeterminate remote transceivers. To this end, a sub-zone query protocol may be determined that identifies this new antenna configuration for querying a sub-zone 70 (350). The sub-zone antenna configuration may include at least one additional antenna different from the initial query antennas. As there may be a finite number of sub-zones 70 to query, the system 10 may determine if all sub-zones have been queried (352). If all sub-zones 70 have been exhausted, the system 10 may conclude that the authorization has failed and end the authorization session (318). However, if an additional sub-zone 70 remains, the process may return to step 314 in which the sub-zone 70 may be queried in accordance with the sub-zone query protocol. Like the initial query phase, a sub-zone query signal may be transmitted from the sub-zone antenna configuration. Additional, and perhaps more conclusive, location information may be obtained in reply signals transmitted from the remote transceivers 14 in response to the sub-zone query signal.

Returning to step 348, if it is determined that the post-challenge evaluation conditions are satisfied, the system 10 may proceed with challenging the indeterminate remote transceiver rather than re-querying using sub-zone criteria. A post-challenge evaluation may utilize RSSI data returned from a challenged remote transceiver 14 in the encrypted response signal 68 to resolve the indeterminate position of the remote transceiver. Because the post-challenge evaluation may eliminate the need to conduct an additional query phase using sub-zone criteria, latency may be reduced for this final attempt at authorization. As previously mentioned, the post-evaluation conditions tend to signify that all other attempts to authorize a remote transceiver have been exhausted. For instance, one condition may be that only one remote transceiver remains to be challenged. Further, another condition may be that there are no more authorization zones 32 or sub-zones 70 to query for the current authorization session. Since a post-challenge evaluation may utilize RSSI data returned from the indeterminate remote transceiver in its encrypted challenge response, additional post-challenge evaluation conditions may be that the current query/challenge sub-zone protocol specify that only one additional antenna 34 is required for the current sub-zone and that the required additional antenna is the same as the specified challenge antenna. In this instance, the challenge antenna may be explicitly specified in both the sub-zone query and challenge protocols.

In the event that all of the post-challenge evaluation conditions are satisfied, the indeterminate remote transceiver 14 may be flagged for post-challenge evaluation (354) and then proceed to the challenge phase beginning at step 328. If a valid encrypted challenge response signal 68 was received from the indeterminate remote, the system 10 may again look for the post-challenge evaluation flag to be present, as provided at step 338. If the post-challenge evaluation flag is present, as it is in this instance, RSSI data obtained in the challenge response signal 68 may be evaluated to resolve the indeterminate position of the remote transceiver 14 (356). Next, the system 10 may determine whether the new RSSI data is sufficient to indicate that the remote transceiver 14 is in an included position (358). If the RSSI data fails to indicate an included position, the system 10 may conclude that the authorization has failed and end the authorization session (318). However, if the RSSI data does indicate that the remote transceiver 14 is located in an included position, the system 10 may conclude that remote transceiver is successfully authorized and the passive function may be carried out (340).

Figure 4A:
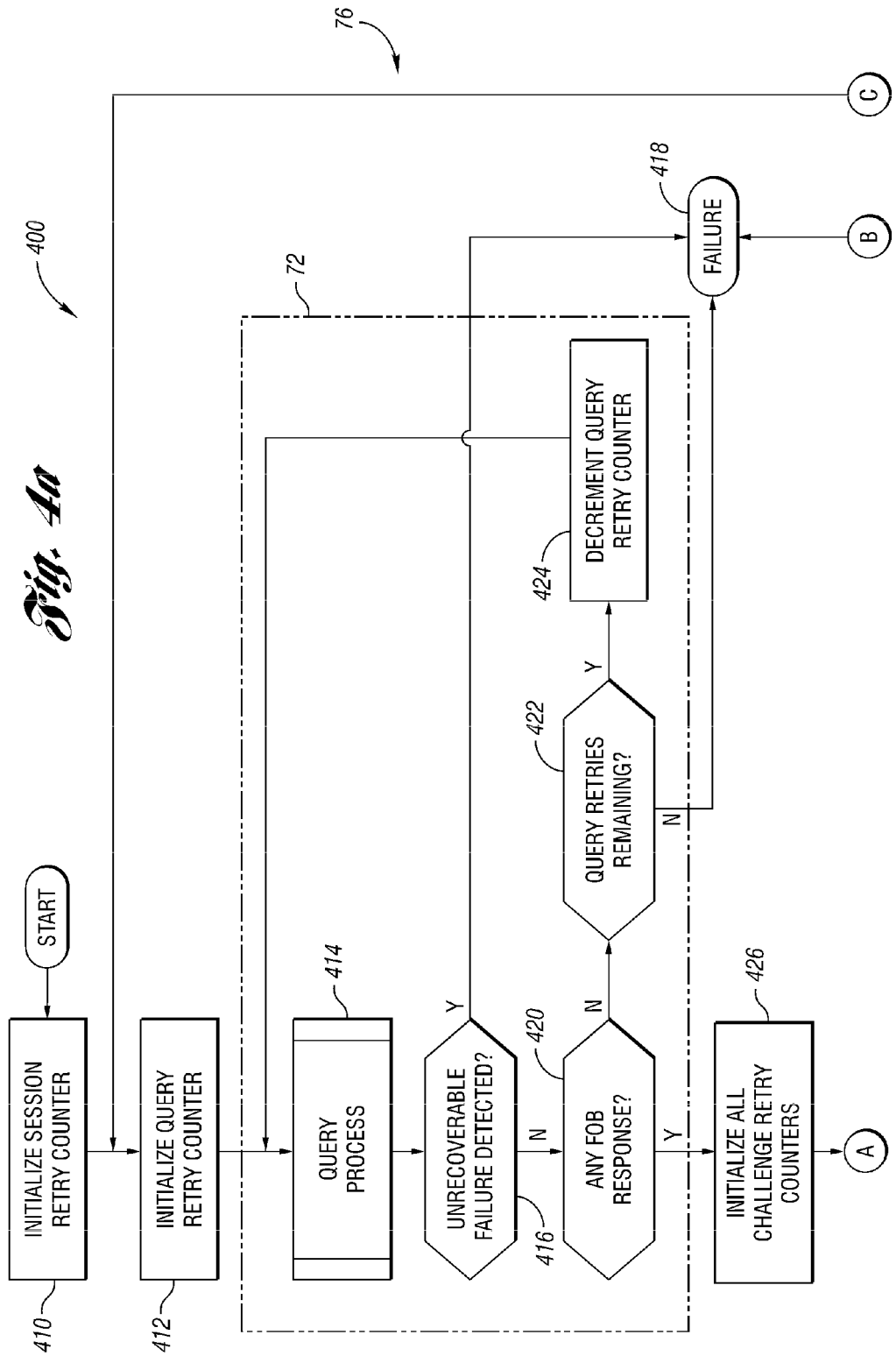
FIGS. 4a-b illustrate a simplified, exemplary process flowchart depicting another method in accordance with one or more embodiments of the present application.
Figure 4B:
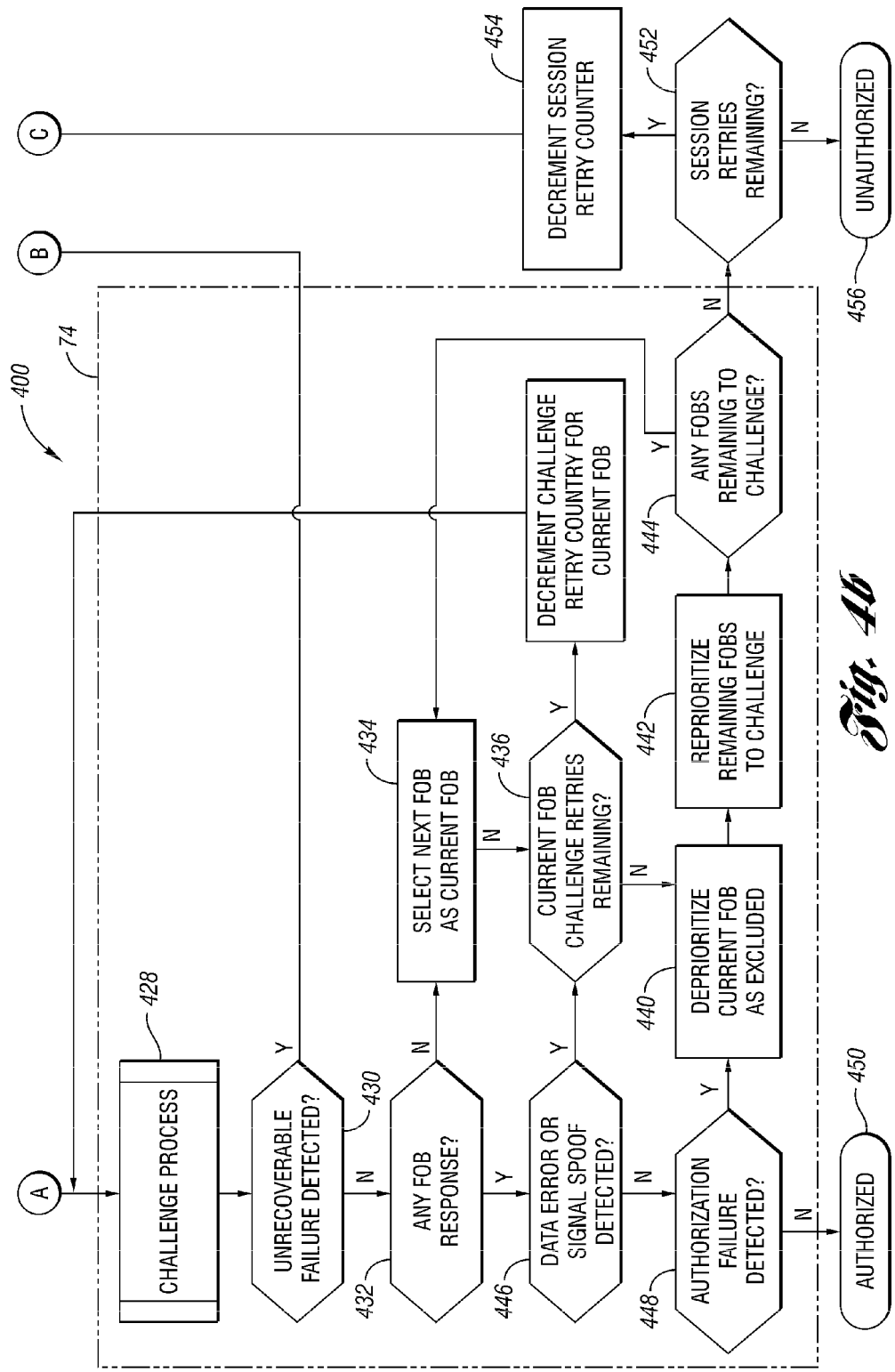

As described above, authorization management for a multi-remote transceiver scenario can be complex under normal operating conditions. However, the authorization management and protocol in a multi-remote scenario involving unexpected behavior and/or system failures may be equally, if not more, complex in nature. Moreover, as system latency is a priority, managing authorization failures may be equally important. Since a passive activation system is a two-way, radio based communication system, there are situations and opportunities where communications can be corrupted. This may lead to degraded performance or loss of functionality of the passive activation system as perceived by the user or operator. To contend with these conditions, a multi-state, conditional retry strategy and methodology may be employed, as depicted in FIG. 4a-b. The retry strategy may have two primary priorities: a) keep the performance latency as minimal as possible; and b) insure fail-safe operation of the passive activation system 10 during poor operating conditions. The retry method may be divided into several sub-functions. For example, the retry method may include a query phase retry strategy 72, a challenge phase retry strategy 74, and an authorization session retry strategy 76.

Query Phase Retry Strategy

As previously described, the passive activation system 10 may be activated upon, for example, an attempt by an operator to gain entry to the vehicle 12 by physically touching an access handle 26. Upon such an event, the passive activation system 10 must authorize a remote transceiver 14, typically carried by a valid operator, mated to the system 10 using a challenge/response protocol. To wake-up and identify remote transceivers 14 proximate the vehicle 12 for the challenge phase 40, the query phase 38 may first be conducted to determine the presence of one or more remote transceivers that may be candidates for challenging. The execution of the query phase 38 and the challenge phase 40 may constitute an authorization session.

As previously described, the passive activation system 10 may transmit a first query signal 48 during the initial query phase. All remote transceivers 14 within range may receive the first query signal 48 and transmit a first query reply signal 56 back to the passive activation system 10 in response. If the passive activation system 10 does not receive any responses from any remote transceiver, the system may retry the query phase 38 up to a specified number of counts. If the retry counts are exhausted before any responses are received, then failed operation of the passive activation system 10 may be assumed. On the other hand, if at least one response is received from a remote transceiver, the passive activation system 10 may assume this is the only remote transceiver present and no further retries may be executed to query for additional remote transceivers 14. In this event, normal operation may be assumed and the challenge phase 40 may commence. However, if an unrecoverable failure is detected, the authorization session may stop immediately.

Furthermore, for passive related functions that may be executed for the purpose of search, location or other similarly related functions, where the priority is to locate all possible remote transceivers 14, the query phase 38 may be unconditionally retried up to a specified number of counts for the purpose of intrinsic redundancy. In this case, the redundant query phases may assure that all remote transceivers have multiple opportunities to respond in the unforeseen event of disturbances in communication during one or more query phases or remote transceiver responses.

Challenge Phase Retry Strategy

During the challenge phase 40, each remote transceiver 14 that is included in the authorization zone 32 to be challenged may be assigned its own retry counter. The retry counters for all remote transceivers 14 may be initialized to the same specified number of counts. The retry counter for each remote transceiver 14 may be decremented as each remote transceiver retries the challenge phase 40. Once a remote transceiver's retry counter reaches zero, that remote transceiver may no longer be challenged and may then be reclassified as excluded for the remainder of the authorization session. The remote transceivers 14 may then be re-prioritized according to the challenge hierarchy, in which case the second highest priority remote transceiver now becomes the first highest priority remote transceiver and so on. When the last included remote transceiver is reached, the system 10 may wrap back around to the first highest priority included remote and continue the retries as necessary until a remote transceiver is authorized. When all retries have completely been exhausted on every included remote transceiver, the system 10 may then move into processing and management of any indeterminate remote transceivers, as previously described herein.

The conditions that govern the retry order, in the case where multiple remote transceivers 14 are present, may depend upon the type of failure prompting a retry. As previously stated, the highest priority included remote transceiver may always be challenged first. When this unit fails the challenge phase 40, there can be several reasons why the challenge failed. According to one or more embodiments of the present application, the failure type may determine the next remote transceiver to retry.

A first failure type may be referred to as a simple failure. Simple failures may include failures due to a cyclic redundancy check (CRC), relay attacks, and the like. Therefore, a simple failure may be detected when a data error occurs or a spoofed signal is detected. If the failure is a simple failure, the same remote transceiver may be retried. This is because the system may know that the remote transceiver is present and was previously established to be the best candidate for the challenge phase. Therefore, incessant retries on the same remote transceiver may occur for simple failures until the unit's retry counter reaches zero.

A second failure type may be referred to as a complex failure. Complex failures may include instances in which no response is received from a challenged remote transceiver. If the failure is a complex failure, the retry may occur on the next highest priority included remote transceiver in the authorization zone. This is because the system may assume the current remote transceiver is no longer within communication range or the UHF channel on which the remote transceiver transmits is being jammed. Therefore, a successive retry on the next highest priority remote transceiver may immediately occur for complex failures.

A third failure type may be referred to as an explicit failure. Explicit failures may correspond to instances in which a response is received, but the system cannot validate the remote transceiver's security credentials. Thus, the remote transceiver may be deemed unauthorized. If the failure is an explicit failure, such as the remote transceiver being unauthorized, the remote transceiver may be immediately de-prioritized as excluded for the remainder of the authorization session. The remaining remote transceivers may then be re-prioritized and the retry may occur on the next highest priority included remote transceiver in the authorization zone.

A fourth failure type may be referred to as an unrecoverable failure. Unrecoverable failures may include hardware or system failures. If the failure is an unrecoverable failure, the authorization session may be immediately interrupted and no retries of any kind may occur.

Authorization Session Retry Strategy

If the authorization session has failed after completely exhausting all retries and possibilities for success absent an unrecoverable failure, an authorization session retry may implemented that can automatically re-trigger the authorization zone for a specified number of counts. In this regard, the query and challenge retry counters may be reset and the query process reinstituted. This third retry may be the last and final attempt at failsafe operation of the passive activation system 10. The authorization session retry may occur until a remote transceiver 14 is authorized or until the retry counts have been exhausted.

Referring now to FIG. 4*a-b*, a simplified, exemplary process flowchart 400 depicting the retry methodology for managing authorization failures in connection with the passive activation system 10 according to one or more embodiments of the present application is shown. Prior to commencement of the query phase retry strategy 72, an authorization session retry counter for the passive activation system 10 may be initialized for a predetermined number of authorization retry counts (410). Next, a query retry counter may be initialized for a predetermined number of query retry counts prior to the initial query process (412). Then, the query process described above may occur in which a query signal 48 may be transmitted from a plurality of query antennas 34 to detect for the presence of one or more remote transceivers 14 proximate the vehicle 12 (414). Prior to checking for any responses to the query signal, the system 10 may determine whether an unrecoverable failure has occurred (416). As previously mentioned, upon detection of an unrecoverable failure, such as a hardware or system failure, the authorization session may be immediately terminated (418).

However, assuming no unrecoverable failures have been detected, the system 10 may determine whether any reply signals 56 have been received from the remote transceivers 14 in response to the query signal 48 (420). If a reply signal 56 has not been received from any remote transceiver 14, a complex failure may be detected and the query process may be retried. To this end, the system 10 may determine whether the query retry counter has been depleted (422). If the query retry counter has reached zero without receiving any remote transceiver responses, the system 10 may determine that no valid remote transceivers are present and prevent the passive related function, such as passive entry or passive start, from occurring (418). If, however, additional retries remain, the query retry counter may be decremented (424) and the query process retried (414).

For passive related functions that may be executed for the purpose of search, location or other similarly related functions, where the priority is to locate all possible remote transceivers 14, the query phase 38 may be unconditionally retried up to a specified number of counts for the purpose of intrinsic redundancy, as previously mentioned. In this case, the redundant query phases may assure that all remote transceivers have multiple opportunities to respond in the unforeseen event of disturbances in communication during one or more query phases or remote transceiver responses. Accordingly, the query process at step 414 may reoccur up to the specified number of counts regardless of whether a reply signal 56 has been received. In this instance, a thorough search may take precedence over latency concerns.

Returning to step 420, if a reply signal 56 is received from at least one remote transceiver 14, the challenge phase 40 may commence and the challenge phase retry strategy 74 may be employed. At the outset, a challenge phase retry counter for each of the remote transceivers 14 responsive during the query phase 38 may be initialized for a predetermined number of challenge retry counts (426). Then, as described herein, the challenge process may begin in which an encrypted challenge signal 58 is sent from a challenge antenna to the remote transceiver 14 at the top of the challenge order, in accordance with the challenge hierarchy, in an attempt to valid the remote transceiver's security credentials (428). Again, the system 10 may detect for unrecoverable failures, such as a hardware or system failure, during the challenge phase 40 (430). Assuming no unrecoverable failures have been detected that would terminate the authorization session, the system 10 may determine whether a response signal 68 has been received from the remote transceiver presently being challenged (432).

If a response from the challenge remote transceiver has not been received, a complex failure may be detected and the system 10 may decide to challenge the next highest priority remote transceiver according to the challenge order. In this regard, the next highest priority remote transceiver may become the current remote transceiver for challenge purposes (434). The system 10 may then determine whether challenge phase retry counter for the current remote transceiver to be challenged is depleted (436). If challenge retry counts remain for the current remote transceiver 14, the corresponding challenge phase retry counter may be decremented (438) and the challenge process retried (428). On the other hand, if no retries remain for the current remote transceiver 14, the remote transceiver may be re-classified as excluded for the remainder of the authorization session (440). Correspondingly, the remaining remote transceivers may be re-prioritized according to the challenge hierarchy and a new challenge order determined (442). The system 10 may then determine whether any remote transceivers 14 remain that are candidates for the challenge process (444). Assuming there remains additional remote transceivers to challenge, the process may return to step 434 in which the next remote transceiver according to the challenge order may be selected for challenge purposes.

Returning briefly to step 432, if it is determined that a response signal 68 has been received from the challenged remote transceiver 14, the system 10 may next determine whether a data error has occurred or whether the response signal has been spoofed (446). If so, a simple failure may be detected, such as a CRC or relay attack, that may inhibit authorization of the remote transceiver 14 currently being challenged. If a simple failure does exist, the system 10 may simply re-challenge the same remote transceiver 14. Accordingly, the method may proceed to step 436 in which the system 10 checks whether additional challenge retry counts for the current remote transceiver remain. If, however, no simple failures are detected, the system 10 may next determine whether the authorization has failed due to an explicit failure (448). As previously described, an explicit failure may occur when the security credentials transmitted in the response signal 68 from the challenged remote transceiver 14 cannot be validated by the passive activation system 10. If an explicit failure is not detected, the remote transceiver 14 may be authorized and the passive vehicle function may be carried out (450). For passive related functions that may be executed for the purpose of search, location or other similarly related functions, where the priority is to locate all possible remote transceivers 14, the challenge phase may be executed for each remote transceiver 14 responsive during the query phase, even if one has already been validated. However, if the response signal 68 cannot be validated and an explicit failure is detected, the method may proceed to step 440 in which the challenged remote transceiver is de-prioritized as excluded for the remainder of the authorization session.

Returning to step 444, if the current authorization session has failed after completely exhausting all retries for all remote transceivers detected, and no remote transceivers 14 remain to be challenged, the entire authorization session may be retried. Accordingly, the system 10 may first determine whether any authorization retry counts remain in the authorization session retry counter (452). If authorization retry counts remain, the system 10 may decrement the authorization session retry counter (454) and the method can return to step 412 in which the authorization zone is re-queried. If, however, no authorization retry counts remain, the system 10 may conclude that the authorization attempt was unsuccessful as unauthorized and finally terminate the authorization process (456).

It should be noted that the method of FIGS. 3a-b and 4a-b as described herein is exemplary only, and that the functions or steps of the method could be undertaken other than in the order described and/or simultaneously as may be desired, permitted and/or possible.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for authorizing a passive vehicle function, the method comprising:
   transmitting a first query signal for receipt by a plurality of remote transceivers proximate a vehicle;
   receiving a first reply signal from each of the plurality of remote transceivers receiving the first query signal;
   determining a challenge order for authenticating any one of the plurality of remote transceivers based at least in part upon a location classification for each remote transceiver determined from each first reply signal; and
   transmitting a challenge signal to a selected remote transceiver of the plurality of remote transceivers based upon the challenge order, the challenge signal prompting a challenge reply signal for the selected remote transceiver.

2. The method of claim 1, wherein the first query signal comprises a plurality of sequential signal bursts, each sequential signal burst transmitted from one of a plurality of antennas located on the vehicle.

3. The method of claim 2, wherein the plurality of antennas transmitting the first query signal generate an authorization zone having boundaries defined using signal strength criteria for each of the plurality of antennas.

4. The method of claim 3, wherein the first reply signal includes signal strength data sampled for each signal burst transmitted from the plurality of antennas.

5. The method of claim 4, wherein the location classification of each remote transceiver is based upon the signal strength data.

6. The method of claim 5, wherein the location classification is selected from one of the following locations: within the authorization zone, out of the authorization zone, and indeterminate.

7. The method of claim 6, wherein the challenge order amongst remote transceivers classified as within the authorization zone is further based upon the signal strength data.

8. The method of claim 6, further comprising:
   transmitting a second query signal for receipt by at least one remote transceiver having an indeterminate location upon a determination that no remote transceivers within the authorization zone have been authenticated, wherein the second query signal is at least partially transmitted from at least one additional antenna different from the plurality of antennas;
   receiving a second reply signal from the at least one remote transceiver in response to the second query signal; and
   determining a new challenge order for authenticating the at least one remote transceiver based upon the second reply signal.

9. The method of claim 6, further comprising:
   receiving a valid challenge reply signal from the selected remote transceiver authenticating the selected remote transceiver;
   evaluating the signal strength of the valid challenge reply signal if the location of the authenticated remote transceiver is indeterminate; and
   authorizing the authenticated remote transceiver upon a determination that the signal strength of the valid challenge reply signal indicates that the authenticated remote transceiver is within the authorization zone.

10. A passive activation system for a vehicle, the system comprising:
    a plurality of antennas arranged at various locations throughout the vehicle, the plurality of antennas configured to:
       transmit a first query signal for receipt by one or more remote transceivers located proximate the vehicle, and
       receive a first reply signal transmitted from each of the remote transceivers in response to the first query signal, the first reply signal including signal strength data sampled by the remote transceiver for each of the plurality of antennas; and
    a controller on board the vehicle and in communication with the plurality of antennas, the controller configured to:
       determine a challenge order for authenticating any one of the remote transceivers based upon the signal strength data transmitted in each first reply signal, and
       instruct a challenge antenna to transmit a challenge signal to one of the remote transceivers based upon the challenge order.

11. The system of claim 10, wherein the first query signal comprises a plurality of sequential signal bursts, each sequential signal burst transmitted from one of the plurality of antennas.

12. The system of claim 10, wherein the signal strength data in each first reply signal indicates whether the location of the corresponding remote transceiver is included within an authorization zone, excluded from the authorization zone, or indeterminate.

13. The system of claim 12, wherein boundaries of the authorization zone are defined using signal strength criteria for each of the plurality of antennas.

14. The system of claim 13, wherein remote transceivers located within the authorization zone are challenged before remote transceivers having an indeterminate location.

15. The system of claim 14, wherein remote transceivers having stronger signal strength data are challenged before remote transceivers having weaker signal strength data.

16. The system of claim 12, further comprising at least one additional antenna different than the plurality of antennas, the at least one additional antenna configured to:
    at least partially transmit a second query signal for receipt by at least one remote transceiver having an indeterminate location, and
    receive a second reply signal from the at least one remote transceiver in response to the second query signal, the second reply signal including signal strength data sampled by the at least one remote transceiver for each of the plurality of antennas, wherein the signal strength data in each second reply signal indicates whether the location of the corresponding remote transceiver is included within an authorization sub-zone, excluded from the authorization sub-zone, or still indeterminate.

17. The system of claim 16, wherein the controller is further configured to determine a new challenge order for authenticating the at least one remote transceiver based upon the second reply signal.

18. The system of claim 12, wherein the challenge antenna is configured to receive a valid challenge reply signal from one of the remote transceivers to obtain an authenticated remote transceiver; and
    wherein the controller is further configured to:
       evaluate the signal strength of the valid challenge reply signal if the location of the authenticated remote transceiver is indeterminate, and
       authorize the authenticated remote transceiver upon a determination that the signal strength of the valid challenge reply signal indicates that the authenticated remote transceiver is within the authorization zone.

19. A method for authorizing a passive vehicle function, the method comprising:
- querying for the presence of a remote transceiver within an authorization zone using a number of antennas positioned throughout a vehicle that each transmit a signal burst;
- receiving a response from at least two remote transceivers proximate the vehicle, each response including an RSSI value for each signal burst;
- determining a location for each remote transceiver with respect to the authorization zone based on the RSSI value;
- classifying each remote transceiver as either included in the authorization zone, excluded from the authorization zone, or indeterminate based on the determined location;
- determining a primary challenge order for challenging each remote transceiver individually based upon the classification;
- determining a secondary challenge order for challenging remote transceivers included in the same class based upon the RSSI value;
- determining an overall challenge order based upon the primary challenge order and the secondary challenge order; and
- sequentially challenging the at least two remote transceivers by transmitting an encrypted challenge signal from a challenge antenna to each remote transceiver in accordance with the overall challenge order until a valid challenge response signal is received with matching encryption from one of the at least two remote transceivers.

20. The method of claim 19, further comprising:
- querying for the presence of an indeterminate remote transceiver within a sub-zone using at least one additional antenna upon a determination that no remote transceivers within the authorization zone have been authenticated;
- receiving a second response from the at least two remote transceivers; and
- determining a new challenge order for challenging the at least two remote transceivers based at least in part upon the second response

* * * * *